(12) United States Patent
Doi et al.

(10) Patent No.: US 8,787,346 B2
(45) Date of Patent: Jul. 22, 2014

(54) WIRELESS COMMUNICATION APPARATUS AND WIRELESS COMMUNICATION METHOD

(75) Inventors: Hiroshi Doi, Osaka (JP); Taisuke Matsumoto, Sunnyvale, CA (US)

(73) Assignee: Panasonic Corporation, Osaka (JP)

( * ) Notice: Subject to any disclaimer, the term of this patent is extended or adjusted under 35 U.S.C. 154(b) by 1371 days.

(21) Appl. No.: 12/376,237

(22) PCT Filed: Aug. 2, 2007

(86) PCT No.: PCT/JP2007/065204
§ 371 (c)(1),
(2), (4) Date: Feb. 19, 2009

(87) PCT Pub. No.: WO2008/016124
PCT Pub. Date: Feb. 7, 2008

(65) Prior Publication Data
US 2009/0323667 A1  Dec. 31, 2009

(30) Foreign Application Priority Data

Aug. 4, 2006 (JP) ................. 2006-213645
Aug. 2, 2007 (JP) ................. 2007-202079

(51) Int. Cl.
| H04J 3/24  | (2006.01) |
| H04B 7/212 | (2006.01) |
| H04J 3/00  | (2006.01) |
| H04W 4/00  | (2009.01) |
| H04W 8/26  | (2009.01) |
| H04W 84/18 | (2009.01) |
| H04W 8/00  | (2009.01) |

(52) U.S. Cl.
CPC ............... *H04W 8/26* (2013.01); *H04W 84/18* (2013.01); *H04W 8/005* (2013.01)

USPC .......... 370/349; 370/348; 370/345; 370/347; 370/338

(58) Field of Classification Search
USPC ......................................... 370/349
See application file for complete search history.

(56) References Cited

U.S. PATENT DOCUMENTS

2005/0007962 A1* 1/2005 Nam et al. ............... 370/252
(Continued)

FOREIGN PATENT DOCUMENTS

| WO | 2005/076533 | 8/2005 |
| WO | 2005/076544 | 8/2005 |

OTHER PUBLICATIONS

International Search Report dated Oct. 2, 2007.
(Continued)

*Primary Examiner* — Noel Beharry
(74) *Attorney, Agent, or Firm* — Dickinson Wright PLLC

(57) ABSTRACT

There is disclosed a wireless communication apparatus that does not interrupt synchronous communication but can continuously perform the synchronous communication even when an address duplication occurs between the local wireless communication apparatus and a nearby wireless communication apparatus. A plurality of wireless communication apparatuses constitutes an ad hoc network system where they transmit beacons to each other. In the wireless communication apparatus, an address processing part (145) generates a first address, which includes a beacon period slot number corresponding to the position-on-beacon-period of a beacon generated by the local wireless communication apparatus, and a second address assigned at random. A beacon processing part (140) determines whether the second address generated by the address processing part (145) is coincident with a second address at another wireless communication apparatus. A transmitting part (170) uses one of the first and second addresses generated by the address processing part (145) to transmit a frame to the other wireless communication apparatus.

12 Claims, 9 Drawing Sheets

(56) References Cited

U.S. PATENT DOCUMENTS

2006/0023643 A1* 2/2006 Lim .............................. 370/254
2006/0092909 A1* 5/2006 Ho ............................... 370/348
2007/0258508 A1* 11/2007 Werb et al. ................... 375/140
2008/0259895 A1* 10/2008 Habetha et al. ............... 370/345

OTHER PUBLICATIONS

Y. Zang, et al., "Towards High speed Wireless Personal Area Network—Efficiency Analysis of MBOA MAX," http//www.ctr.kcl.ac.uk/IWWAN2005/papers/88_invited_Philips.pdf, May 2005, 10 pages total.

* cited by examiner

|  | BEACON PERIOD SLOT NUMBER | DEVICE ADDRESS |
|---|---|---|
| INFORMATION ON RELEVANT DEVICE | ADDRESS (ID) OF RELEVANT DEVICE | A |
| INFORMATION ON RELEVANT DEVICE | SLOT NUMBER OF RELEVANT DEVICE | 2 |
| BPOIE (INFORMATION ON OTHER DEVICES) | 0 | NOT USED |
| BPOIE (INFORMATION ON OTHER DEVICES) | 1 | X |
| BPOIE (INFORMATION ON OTHER DEVICES) | 2 | – |
| BPOIE (INFORMATION ON OTHER DEVICES) | 3 | – |
| BPOIE (INFORMATION ON OTHER DEVICES) | 4 | – |
| BPOIE (INFORMATION ON OTHER DEVICES) | 5 | – |

FIG.6

|  | BEACON PERIOD SLOT NUMBER | DEVICE ADDRESS |
|---|---|---|
| INFORMATION ON RELEVANT DEVICE | ADDRESS (ID) OF RELEVANT DEVICE | A |
| INFORMATION ON RELEVANT DEVICE | SLOT NUMBER OF RELEVANT DEVICE | 3 |
| BPOIE (INFORMATION ON OTHER DEVICES) | 0 | NOT USED |
| BPOIE (INFORMATION ON OTHER DEVICES) | 1 | – |
| BPOIE (INFORMATION ON OTHER DEVICES) | 2 | – |
| BPOIE (INFORMATION ON OTHER DEVICES) | 3 | – |
| BPOIE (INFORMATION ON OTHER DEVICES) | 4 | – |
| BPOIE (INFORMATION ON OTHER DEVICES) | 5 | – |

FIG.7

| | | |
|---|---|---|
| INFORMATION ON RELEVANT DEVICE | ADDRESS (ID) OF RELEVANT DEVICE | X |
| | SLOT NUMBER OF RELEVANT DEVICE | 1 |
| BPOIE (INFORMATION ON OTHER DEVICES) | BEACON PERIOD SLOT NUMBER | DEVICE ADDRESS |
| | 0 | NOT USED |
| | 1 | – |
| | 2 | A |
| | 3 | A |
| | 4 | – |
| | 5 | – |

FIG.8

| | | |
|---|---|---|
| INFORMATION ON RELEVANT DEVICE | ADDRESS (ID) OF RELEVANT DEVICE | C |
| | SLOT NUMBER OF RELEVANT DEVICE | 2 |
| BPOIE (INFORMATION ON OTHER DEVICES) | BEACON PERIOD SLOT NUMBER | DEVICE ADDRESS |
| | 0 | NOT USED |
| | 1 | X |
| | 2 | – |
| | 3 | A |
| | 4 | – |
| | 5 | – |

FIG.9

| | |
|---|---|
| INFORMATION ON RELEVANT DEVICE { ADDRESS (ID) OF RELEVANT DEVICE | B |
| SLOT NUMBER OF RELEVANT DEVICE | 3 |

| BEACON PERIOD SLOT NUMBER | DEVICE ADDRESS |
|---|---|
| 0 | NOT USED |
| 1 | X |
| 2 | A |
| 3 | – |
| 4 | – |
| 5 | – |

BPOIE (INFORMATION ON OTHER DEVICES)

FIG.10

WIRELESS COMMUNICATION APPARATUS AND WIRELESS COMMUNICATION METHOD

TECHNICAL FIELD

The present invention relates to a radio communication apparatus and radio communication method in an ad hoc network in a mobile environment in particular.

BACKGROUND ART

In a random access network of a radio communication network, an address of a radio communication apparatus (hereinafter referred to as "device") is an ID (identification code) that uniquely designates the radio communication apparatus, fulfilling the role of a "name", so to speak. Generally, a LAN-type address is assigned a specific ID called a MAC address by the IEEE that differs for each product of each manufacturer. A device performs communication by specifying a communicating party based on this MAC address.

Current MAC addresses have a 48-bit address field. This is 16 bits longer than an Internet Version 4 address field, and therefore enables assignment to more apparatuses. However, even a 48-bit address field will not meet the future demand for MAC addresses, and therefore the use of EUI-64 providing a 64-bit address is planned.

Thus, addresses assigned to apparatuses are becoming ever longer. However, a problem when processing is performed on a LAN-type network using such an address, especially in the case of a wideband communication network for implementing large-volume communication, is that an address becomes an overhead. And as a result of this, there is a problem of the frame length for a control protocol that performs radio communication protocol maintenance becoming long.

With the WiMedia MAC protocol (see Non-patent Document 1 for details) that actually utilizes microwave UWB (Ultra Wide Band), communication is performed using an address system having a separate mode called a device address (also abbreviated to "DevAddr", and hereinafter referred to simply as "address"), 2 bytes in length, in addition to a MAC address that performs authentication management of a device. This is a technique for reducing MAC address overhead.

The address system is as described below. A 16-bit address excluding a special multicast address or the like is installed arbitrarily in the local apparatus. If the source address of a received frame, or a BPOIE (Beacon Period Occupation Information Element) described later herein contains the same address, a value that does not duplicate a device ID that can be recognized by another beacon or BPOIE is calculated and re-set.

A BPOIE is information contained in a beacon for confirming mutual device recognition when all devices participating in a radio network align and transmit beacons in order to measure super-frame synchronization on an autonomous distributed network. At this time, information indicating that a beacon of device A is present in the X'th slot is transmitted among a plurality of devices. If a particular device recognizes that its own address is not written in even one slot that it transmits itself, that device considers that a duplication (collision) has occurred, and shifts to a different slot. As a result, that device can acquire a list of addresses of nearby or next-nearby devices, which helps in deciding a slot in which its own beacon is transmitted.

Non-patent Document 1: Yunpeng Zang et. al., "Towards High Speed Wireless personal Area Network-Efficiency Analysis of MBOA MAC," http://www.ctr.kcl.ac.uk/IW-WAN2005/papers/88_invited_Philips.pdf

DISCLOSURE OF INVENTION

Problems to be Solved by the Invention

However, a problem with this kind of conventional technology is that when an address duplication occurs between nearby or next-nearby devices, synchronous communication is interrupted, and continuous synchronous communication cannot be performed.

The above problem with the conventional technology will now be explained using FIG. 1. FIG. 1 is a drawing explaining the situation and operation when, while device Q having address A (the right-hand device in FIG. 1) and device P having address X are communicating, device R having the same address A approaches (3000). The vertical axis represents elapsed time. When device R having address A approaches, device P having address X recognizes that there are two devices having the same address A in different slots in the beacon period (BP) of a particular super-frame (3100).

At this time, a slot reservation is established by means of a DRP (Distributed Reservation Period) between device P having address X and device Q having address A communicating with that device. When device P having address X attempts to transmit data to device Q having address A at this same slot time, not only device Q but also device R reacts with an ACK (acknowledgement) response in the same frame. Consequently, device P having address X receives two ACKs, these collide, and as a result it temporarily becomes impossible to continue communication (3200).

In the next beacon period (BP), device P having address X writes two addresses A in the BPOIE of the beacon it transmits itself (3300), whereby device Q and device R discover that device Q and device R have duplicate addresses (3300).

By this means, address reassignment is executed as described earlier, but it is not recognized by device P that the addresses of device R and device Q have become B and C respectively in the next data period (DP) (3400). Thus the interruption of synchronous communication continues.

Then, in the next beacon period, device P having address X recognizes that device R has changed to address B and device Q has changed to address C (3500). Whether or not a DRP can be entered in the next data period immediately at this point depends on the order of the beacons of the devices. In any case, device P and device Q restart synchronous communication by performing DRP exchange in the super-frame starting in that beacon period (3500) or the super-frame starting in the next beacon period (3700).

There is thus a problem of a 2- to 3-cycle super-frame time period being required for duplicate address collision resolution, and synchronous communication being interrupted for approximately 128 ms to 192 ms.

It is an object of the present invention to provide a radio communication apparatus and radio communication method that prevent communication being interrupted due to an address duplication, and enable communication to be continued, even when devices having the same address exist nearby or next-nearby.

Means for Solving the Problems

A radio communication apparatus of the present invention is a radio communication apparatus in an ad hoc network system in which a plurality of radio communication apparatuses transmit beacons to each other, and employs a configuration having: an address processing section that generates a first address that includes a beacon period slot number corresponding to the position in a beacon period of a beacon transmitted by itself, and a second address assigned randomly; a beacon processing section that determines whether or not a second address generated by the address processing section matches a second address in another radio communication apparatus; and a transmitting section that transmits a frame to the another radio communication apparatus using one or other of the first address and the second address generated by the address processing section.

Another radio communication apparatus of the present invention is a radio communication apparatus in an ad hoc network system in which a plurality of radio communication apparatuses transmit beacons to each other, and employs a configuration having: a receiving section that receives a frame that includes an address transmitted by another radio communication apparatus; an address determining section that has a first address that includes a beacon period slot number corresponding to the position in a beacon period of a beacon transmitted by itself, and a second address assigned randomly, as its own ID, and determines whether or not an address received by the receiving section matches either the first address or the second address; and a beacon processing section that determines whether or not its own second address matches a second address in the other radio communication apparatus.

Advantageous Effect of the Invention

The present invention prevents communication being interrupted due to an address duplication, and enables communication to be continued, even when devices having the same address exist nearby or next-nearby.

BRIEF DESCRIPTION OF DRAWINGS

FIG. 6 is a drawing showing a sample configuration of a beacon of device Q;

FIG. 7 is a drawing showing a sample configuration of a beacon of device R;

FIG. 8 is a drawing showing a sample configuration of a beacon of device P;

FIG. 9 is a drawing showing another sample configuration of a beacon of device Q;

FIG. 10 is a drawing showing another sample configuration of a beacon of device R;

BEST MODE FOR CARRYING OUT THE INVENTION

An embodiment of the present invention will now be described in detail with reference to the accompanying drawings. Identical configuration elements are assigned the same reference codes, and descriptions thereof are omitted as appropriate.

Figure 1:
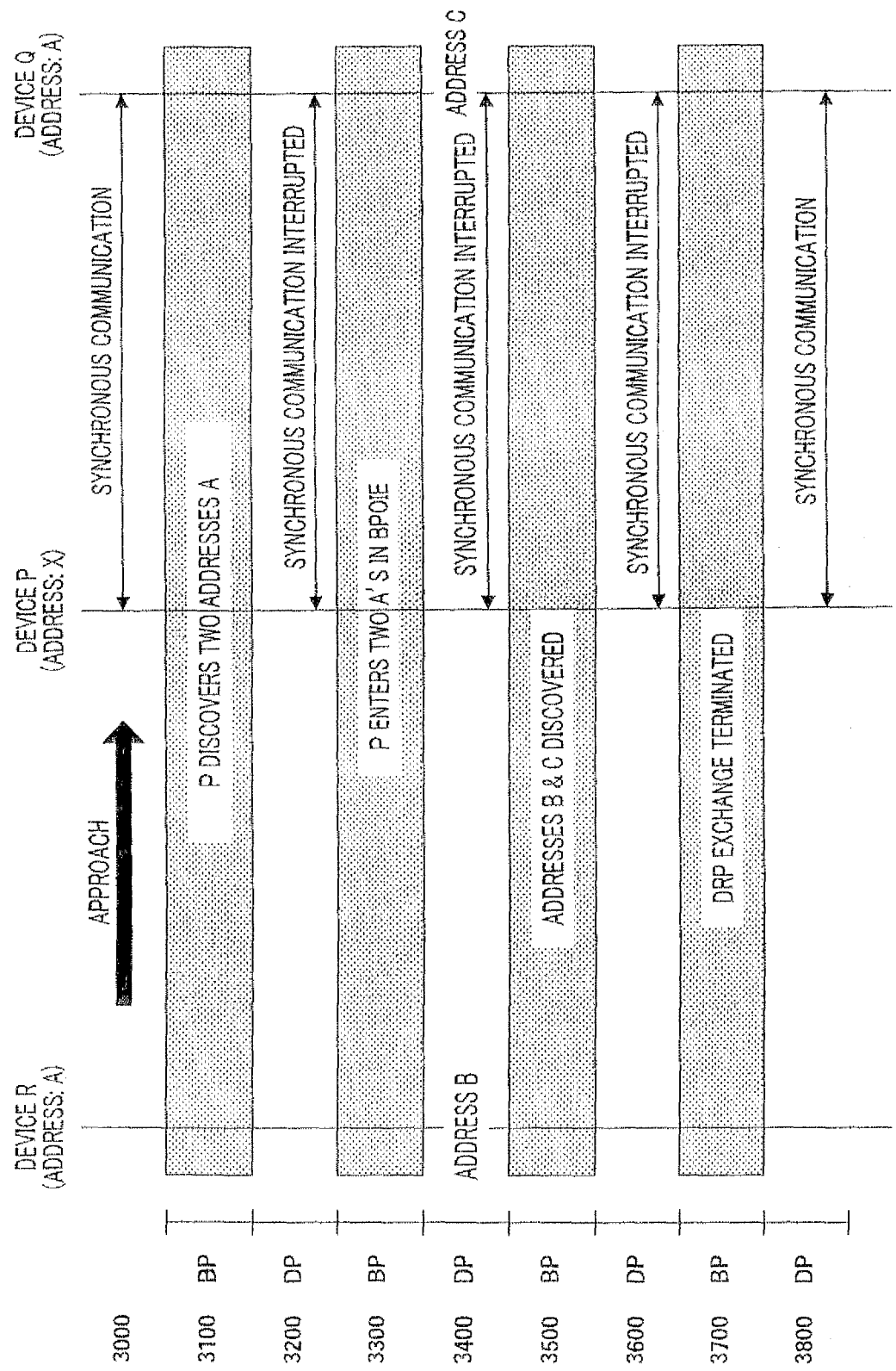
FIG. 1 is an explanatory drawing of communication interruption due to duplicate addresses according to conventional technology.
Figure 2:
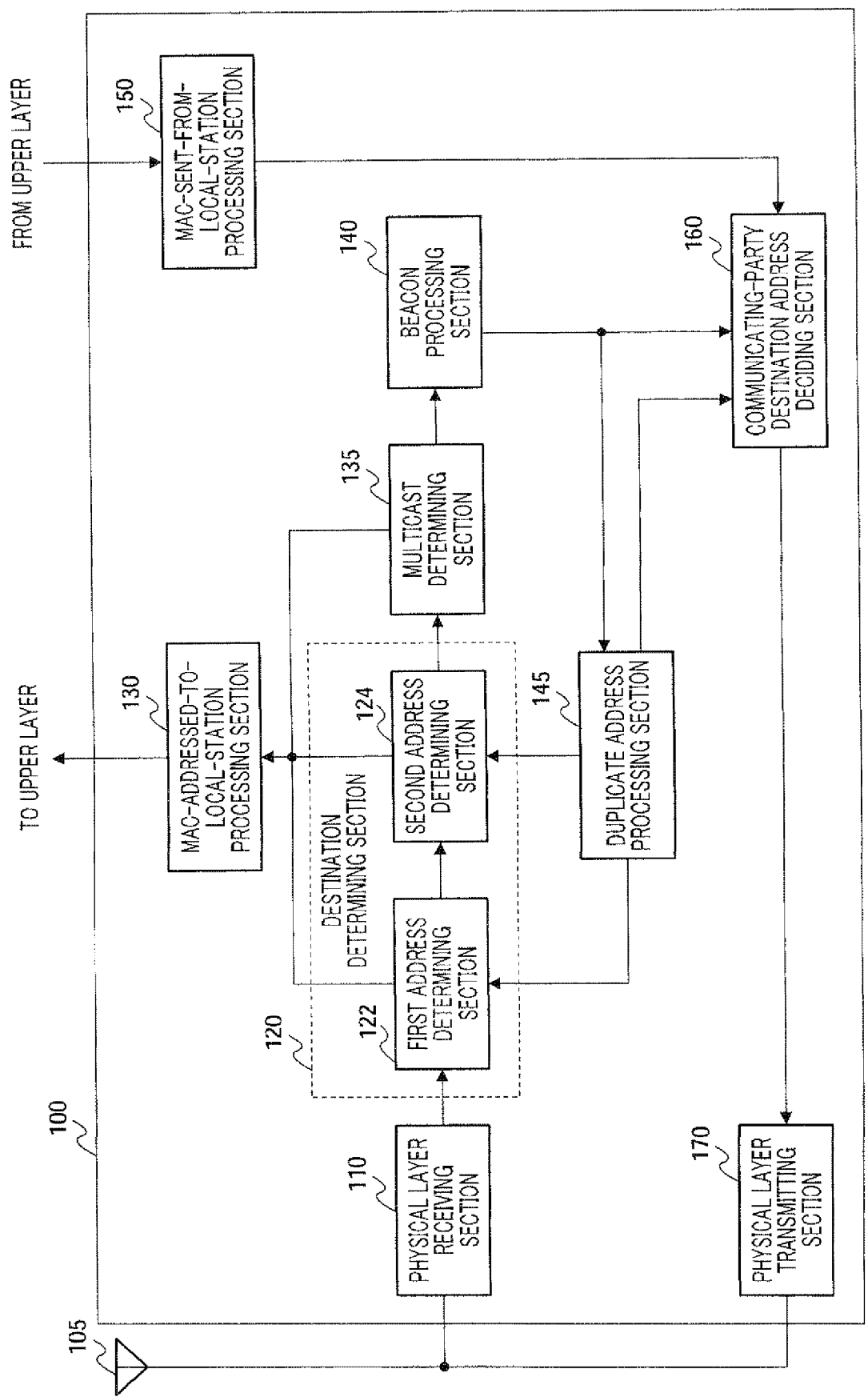
FIG. 2 is a block diagram showing a sample configuration of a radio communication apparatus according to one embodiment of the present invention.

FIG. 2 is a block diagram showing a sample configuration of a radio communication apparatus according to one embodiment of the present invention. Radio communication apparatus 100 shown in FIG. 2 comprises, as mainly reception-related parts, physical layer receiving section 110, destination determining section 120, multicast determining section 135, beacon processing section 140, duplicate address processing section 145, and MAC-addressed-to-local-station processing section 130. Destination determining section 120 is composed of first address determining section 122 and second address determining section 124.

Radio communication apparatus 100 also comprises, as mainly transmission-related parts, MAC-sent-from-local-station processing section 150, communicating-party destination address deciding section 160, and physical layer transmitting section 170 Radio communication apparatus 100 also has antenna 105 as a part relating to both transmission and reception.

In this embodiment, using the above configuration radio communication apparatus 100 can prevent communication being interrupted due to an address duplication, and enable communication to be continued, even when a nearby or next-nearby radio communication apparatus having the same address approaches while radio communication apparatus 100 is performing communication with another radio communication apparatus. Here, "nearby" means, in a narrow sense, a range in which a device may exist for which communication is possible from one device, and "next-nearby" means a range in which a device may exist for which communication is possible from a device in a nearby range as seen from one device. In interpreting the scope of the patent application, "nearby" is assumed to include both "nearby" and "next-nearby".

Figure 3:
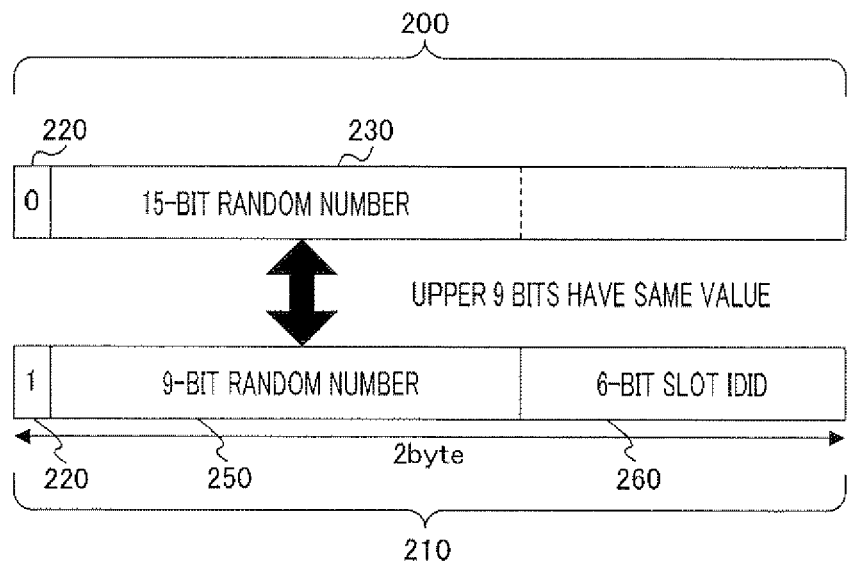
FIG. 3 is a drawing showing a sample address configuration in one embodiment of the present invention.

Next, the configuration of a device address (hereinafter referred to simply as "address") of a radio communication apparatus according to the present invention will be described with reference to FIG. 3. A device address comprises 16 bits, and is defined as follows. Start bit 220 indicates one of two address notation methods. When start bit 220 is 0, this indicates that the address is full-mode address 200, in which case the remaining 15-bit part 230 indicates the original device ID. This 15-bit part 230 is set by being calculated randomly.

When start bit 220 is 1, this indicates that the address is combination-mode address 210, in which case the remaining 15 bits are divided into 9-bit part 250 and 6-bit part 260. Except in the case of 0b111111111, the upper 9 bits of the original device ID are used directly for 9-bit part 250. This 9-bit part 250 is a random value.

A generally widely used method is for an address, which includes only the upper 9 bits in the ID, to be reserved as a multicast address. Therefore, in this embodiment also, this address is not assigned as a device ID. The beacon period slot number is used for the remaining 6-bit part 260.

The beacon period slot number indicates the beacon transmission slot position in a beacon period. The beacon period slot number is decided by a system for selecting a slot position so that there are no devices with the same slot position among nearby or next-nearby devices according to a BPOIE described later herein.

Therefore, devices for which the same lower 6 bits 260 of combination-mode address 210 are the same never exist nearby or next-nearby. Therefore, when beacon period 320 shown in FIG. 4 and described later herein is configured correctly, a combination-mode address can be configured so that a device having the same address as a nearby or next-nearby device does not exist.

Figure 4:
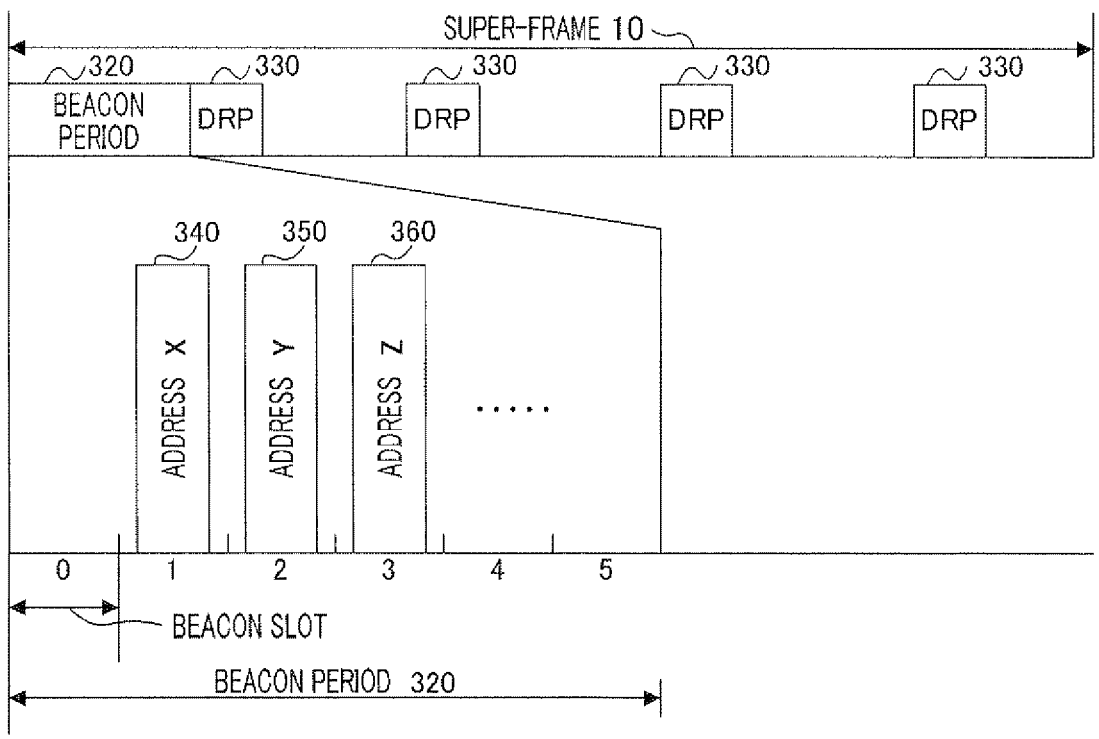
FIG. 4 is a configuration diagram showing a sample configuration of a beacon period in a super-frame.

FIG. 4 is a drawing showing the configuration of a beacon period. Beacon period 320 is placed in the first part of super-frame 10. Beacon period 320 is a collection of beacon slots, separated into beacon slot 0, 1, 2, 3, . . . . At the timing of each beacon slot, the device to which that beacon slot has been assigned transmits a beacon. For example, FIG. 4 shows a case in which an address X device transmits beacon 340 in beacon slot 1, an address Y device transmits beacon 350 in beacon slot 2, and an address Z device transmits beacon 360 in beacon slot 3.

A beacon period slot number indicates the position of a beacon slot in beacon period 320. With regard to which beacon slot a beacon of a particular device is assigned to, the beacon period slot number may be derived from the transmission order of beacons transmitted by each radio communication apparatus.

After beacon period 320, DRPs (Distributed Reservation Periods) 330 are placed as appropriate up to the end of the super-frame. DRP 330 is used by a particular device to reserve communication with another device.

Each device has two addresses, full-mode address 200 and combination-mode address 210, generated from the device ID as its own address. That is to say, at the time of transmission, either may be included in the transmission address, and whichever mode address is received from another device, it must be received normally.

For an address of that device or an address of a communicating-party device, the policy for use of these two mode addresses is established as follows.

(1) When there is no full-mode address duplication Full mode is used.
(2) When there is a full-mode address duplication and the beacon slots are different Full mode is used for a BPOIE, and combination mode is used for address display of processing including other frame transmission and reception. When this mode is entered, provision may be made for a full-mode address to be used after duplication has ceased to occur as a result of changing the full-mode address.

If there is a full-mode address duplication and the beacon slots are the same, full mode is used. In the event of this condition, beacon slot re-admission processing is started. A shift is made to a different duplication-free beacon slot. Communication is interrupted until the shift to a duplication-free beacon slot is completed.

In case (2) above, also, even if there is a full-mode address duplication and the beacon slots are the same, provision is made for the next super-frame to be able to be transmitted and received with the old address or new address when the full-mode address has been changed. In this case, two IDs each have a full-mode address and combination address, and therefore it is necessary to be able to handle a total of four addresses.

A device operates based on the above address usage policy. Since a full-mode address is always displayed for a BPOIE, whether or not there is duplication can be recognized by looking at the BPOIE of a beacon.

When a full-mode address duplication is discovered, a full-mode address is reassigned in order to resolve the address duplication. At this time, a new address is created by entering a random different value in the full-mode address lower 6 bits. A combination-mode address used while the address is changed in this way does not change due to address reassignment.

Communication is also possible when a full-mode new address is a completely new address. However, if a random different value is entered in the lower 6 bits of the new address and the upper 9 bits are made the same as in the old address, the old-address combination-mode address becomes the same as the new-address combination-mode address. Therefore, a random different value is entered in the lower 6 bits of the new address and the upper 9 bits are made the same as in the old address. In this case, also, synchronous communication does not stop until an address change is completed after an address duplication is discovered.

The configuration elements of radio communication apparatus 100 will now be described in detail with reference to FIG. 2.

Antenna 105 transmits and receives electromagnetic waves, and performs reciprocal conversion between an electromagnetic wave and an electrical circuit signal. Physical layer receiving section 110 performs demodulation of a received signal received from antenna 105, converts this signal to an electrical signal that can be recognized as a super-frame, and sends this to destination determining section 120. Destination determining section 120 references a part specified as a destination address in the frame and a destination address written in a beacon frame, and determines whether or not the received data is addressed to that station—that is, data sent to that radio communication apparatus. A frame determined to have the full-mode or combination-mode destination address of that station as a result of this determination is sent to an upper layer, and another frame and beacon are sent to multicast determining section 135.

First address determining section 122 in destination determining section 120 determines whether or not the mode is full mode by checking the start bit of the address of a frame received from physical layer receiving section 110, and if the mode is not full mode, passes the frame to second address determining section 124. If the received frame is a full-mode frame, first address determining section 122 compares that full-mode address with the full-mode address of that station stored in internal memory (not shown), and if they match, determines the frame to be addressed to that station, and sends the frame to MAC-addressed-to-local-station processing section 130. If the addresses do not match, first address determining section 122 determines the frame to be addressed to another station, and passes the frame to second address determining section 124. First address determining section 122 holds a full-mode address generated and randomly assigned by duplicate address processing section 145 as that station's ID. After determination is completed, first address determining section 122 passes the frame and the determination result to MAC-addressed-to-local-station processing section 130 or second address determining section 124. When data received by first address determining section 122 is a beacon, first address determining section 122 sends that beacon to second address determining section 124.

Second address determining section 124 in destination determining section 120 determines whether or not the mode is combination mode by checking the start bit of the address of a frame received from first address determining section 122. If the received frame is a combination-mode frame, second address determining section 124 compares that combination-mode address with the combination-mode address of that station stored in internal memory (not shown), and if they match, determines the frame to be addressed to that station, and sends the frame to MAC-addressed-to-local-station processing section 130. If the addresses do not match, second address determining section 124 determines the frame to be addressed to another station, and sends the frame and the determination result to multicast determining section 135. When data received by second address determining section 124 is a beacon, second address determining section 124 sends that beacon to multicast determining section 135.

Multicast determining section 135 determines whether or not a frame received from second address determining section 124 has been transmitted in multicast mode, and also determines whether or not received data is a beacon. If the frame is determined to be a multicast frame and the data is determined to be a beacon, multicast determining section 135 sends that beacon to beacon processing section 140. If the data is determined not to be a beacon and the frame is determined to be a multicast frame, multicast determining section 135 sends the frame to MAC-addressed-to-local-station processing section 130. MAC-addressed-to-local-station processing section 130 performs processing necessary as a data link layer on a frame received as a frame addressed to that station or a multicast frame, and transfers the frame to an upper layer of the radio communication apparatus.

Beacon processing section 140 references the transmission source addresses (IDs) of devices that transmitted beacons, written in a plurality of beacons within the same beacon period received from multicast determining section 135. Then, if there is an address duplicated in addresses of that plurality of devices or by the address of that station, beacon processing section 140 detects that address. Also, beacon processing section 140 detects a duplication of that station's address by the address of another device by referencing the BPOIE.

Furthermore, beacon processing section 140 detects an address duplication between its own and another device by determining whether or not an address of another device on the beacon and its own address match.

If there is a duplication (collision) between its own address and the address of another device, beacon processing section 140 reports this fact to duplicate address processing section 145 and communicating-party destination address deciding section 160. Also, if there is a duplication in addresses of other devices, this fact is reported to communicating-party destination address deciding section 160.

Beacon processing section 140 performs beacon display item and BPOIE rewriting based on a received beacon and so forth, transfers the result to communicating-party destination address deciding section 160, and enables a beacon with updated contents to be transmitted.

On receiving a report to the effect that there is a duplication between its own address and the address of another device, duplicate address processing section 145 performs generation of a new full-mode address and sends this to first address determining section 122. Then first address determining section 122 rewrites the internally stored full-mode address as the new address. When only the full-mode address lower 6 bits are changed to a different value, the combination-mode address does not change, and therefore it is not necessary to rewrite the combination-mode address stored in second address determining section 124.

Duplicate address processing section 145 performs in advance generation of a full-mode address and a combination-mode address based on a slot number and so forth, and passes the addresses to second address determining section 124. Second address determining section 124 writes those addresses to its internal memory.

However, when a combination-mode address is also changed together with a full-mode address change, duplicate address processing section 145 generates a post-change combination-mode address and sends this to second address determining section 124. Then second address determining section 124 rewrites the internally stored combination-mode address. Furthermore, when an address is duplicated and beacon slot re-admission processing is performed, also, duplicate address processing section 145 generates a post-change combination-mode address and sends this to second address determining section 124. Then second address determining section 124 rewrites the internally stored combination-mode address.

When duplicate address processing section 145 changes a full-mode or combination-mode address, it reports the post-change address to communicating-party destination address deciding section 160.

MAC-sent-from-local-station processing section 150 receives a directive to transmit a frame addressed to another station from an upper layer, performs processing necessary to transmit a frame from that station (the local station), and sends a frame addressed to another station to communicating-party destination address deciding section 160.

On receiving a report from beacon processing section 140 to the effect that a duplication between its own address and the address of another device or an address duplication between other devices has been detected, or when directed to transmit a frame addressed to another device that uses combination mode from an upper layer, communicating-party destination address deciding section 160 changes the destination of a transmit frame from that station (the local station) to a combination-mode address. In this way, switching to a combination-mode address is performed. When there is a full-mode or combination-mode address change, a new address is received from duplicate address processing section 145 and is transmitted to physical layer transmitting section 170 after a change of the address to be displayed in the beacon has been performed. After switching to the combination-mode address has been performed, and after the new address has been made known to other devices using a beacon and it has become possible to perform communication reservation using the full-mode address, switching to the full-mode address is performed again.

Physical layer transmitting section 170 performs processing necessary for transmission as an electromagnetic wave, such as modulation, on a transmit frame received from communicating-party destination address deciding section 160, and sends the frame to antenna 105.

Figure 5:
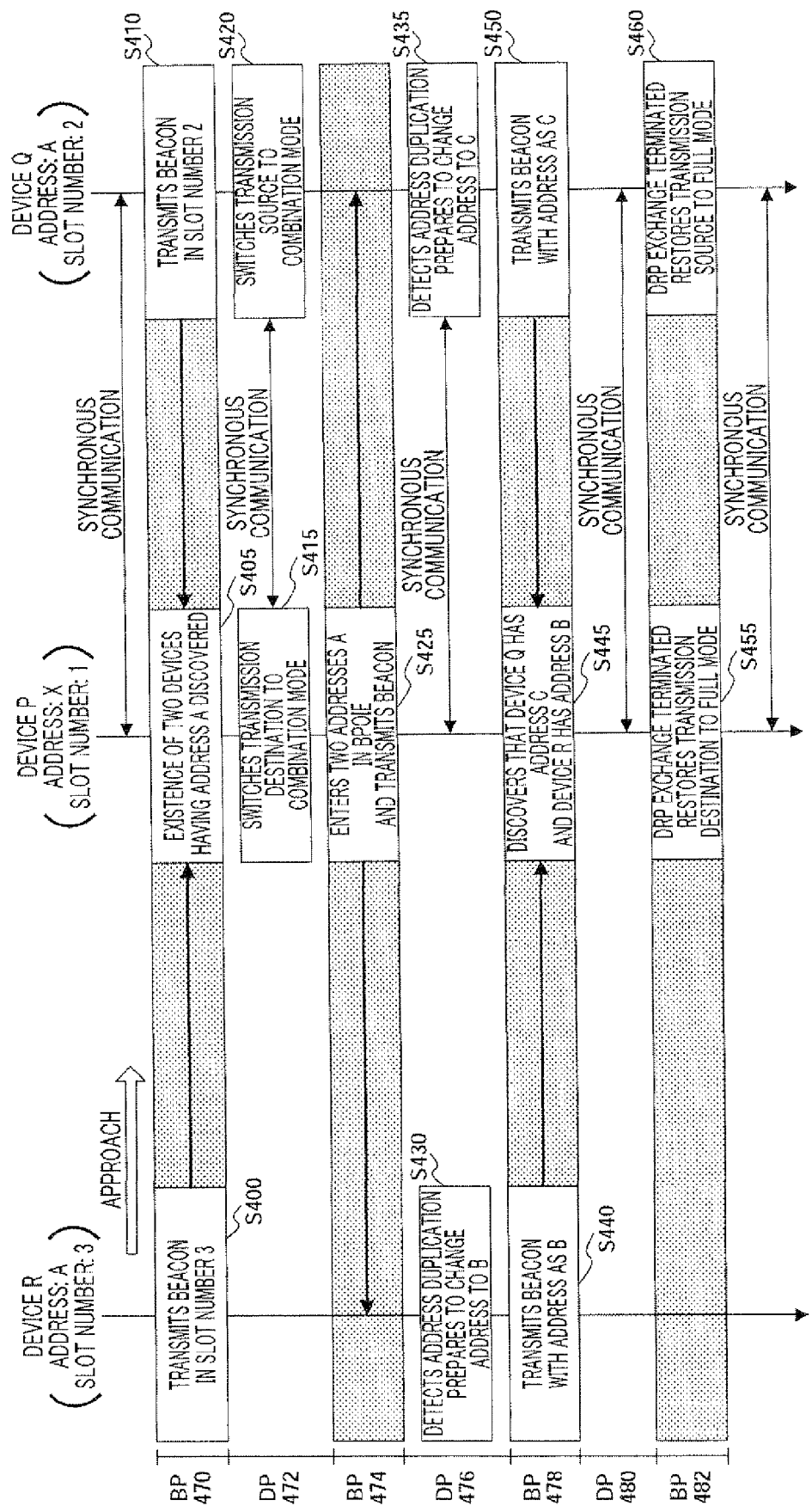
FIG. 5 is a sequence diagram showing a processing procedure when another device approaches a communicating device in one embodiment of the present invention.

The operation of radio communication apparatus 100 having the above configuration will now be described using FIG. 5. Here, as an example, operation is described when device R using address A approaches while device P using address X and device Q using address A are performing synchronous communication. FIG. 5 is a sequence diagram showing the operation of devices P, Q, and R.

Information written in a beacon will be explained here. As shown in FIG. 6 through FIG. 10 and described later herein, a beacon transmitted by a particular device displays an address of that device transmitting that beacon and a slot number of that device as information on that device. Also, in a beacon, a BPOIE indicating information of another device nearby recognized by a device that transmits that beacon is displayed, and an address of another device and a beacon period slot number of a beacon of that device are displayed mutually associated.

In FIG. 5, the vertical axis represents elapsed time. The uppermost part of FIG. 5 represents a state in which device R using address A (hereinafter, use of "address" alone may refer to a full-mode address) approaches while device P using address X and device Q using address A are performing synchronous communication, these devices being radio communication apparatuses of this embodiment. The slot numbers of devices P, Q, and R in a beacon period are 1, 2, and 3 respectively.

In first beacon period 470 ("beacon period" being abbreviated to "BP" in the figure, and likewise hereinafter), it is assumed that device Q having address A transmits a beacon in slot number 2 (S410). Information of the beacon transmitted by device Q at this time is shown in FIG. 6. In FIG. 6, it is shown that the address is A and the slot number is 2. The BPOIE shows that address X of communicating-party device P performing communication as another device is in slot number 1, but at this stage device R information has not yet been reflected.

At this time, it is assumed that device R having address A transmits a beacon in slot number 3 (S400). The beacon information at this time is shown in FIG. 7. The beacon at this time shows that the address of device R is A and its slot number is 3. In the BPOIE, there is no communicating-party performing communication as another device, and an address is not displayed. At this stage, devices P and Q information has not yet been reflected.

Here, in device P having address X, beacon processing section 140, on receiving a beacon transmitted by device Q and a beacon transmitted by device R from multicast determining section 135, recognizes that the beacons from both devices have address A. Therefore, beacon processing section 140 recognizes that a beacon transmitted from device R and a beacon transmitted from device Q exist in different slots, and both devices have the same address A, and determines that the address is duplicated (S405) and conveys this fact to communicating-party destination address deciding section 160.

Figure 11:
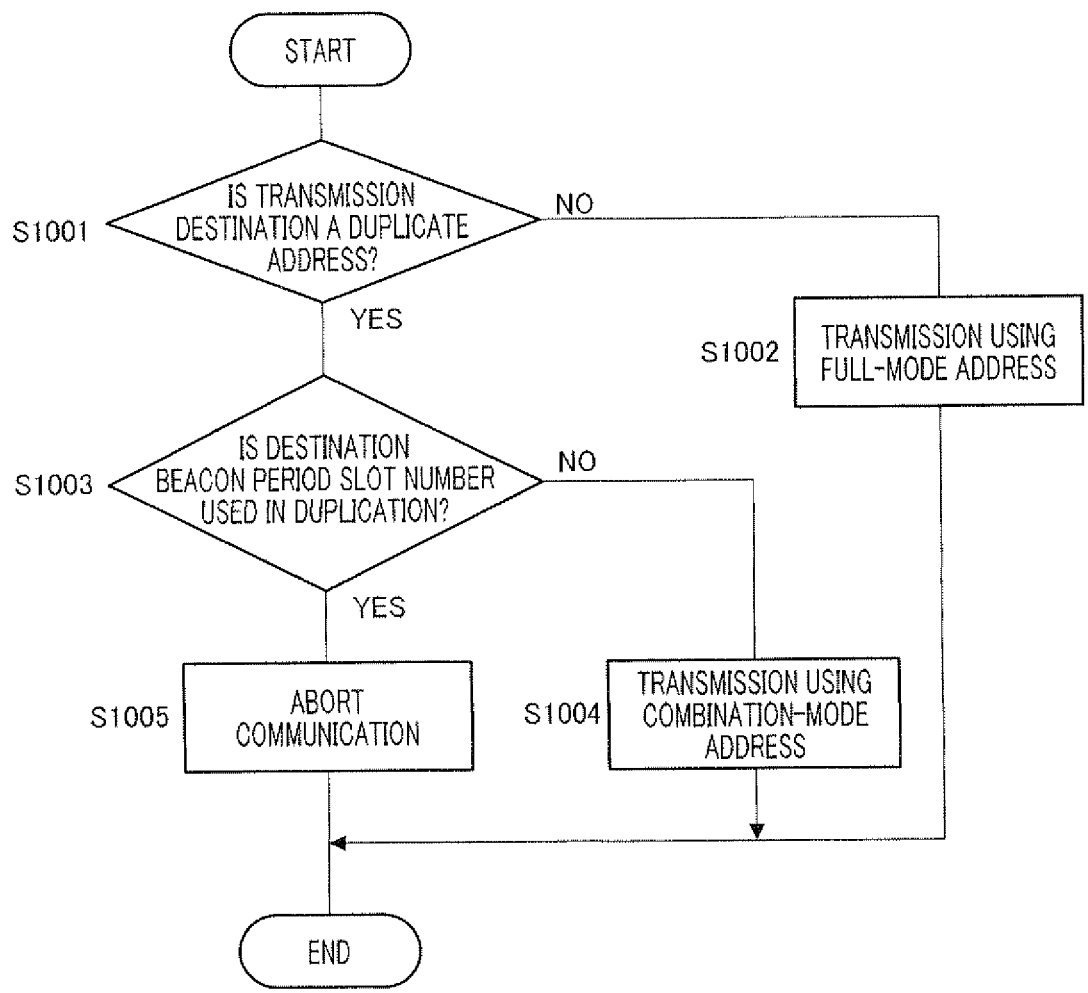
FIG. 11 is a flowchart showing an example of a transmission destination address deciding algorithm.

Here, the transmission destination address deciding algorithm used by communicating-party destination address deciding section 160 will be described. FIG. 11 is a flowchart showing an example of a transmission destination address deciding algorithm.

First, in step 1001, a determination is made as to the presence or absence of another address that duplicates the transmission destination address. If the result of this determination is that there is not a duplicate other address (S1001: NO), in step 1002 transmission is performed using a full-mode address. If there is a duplicate address (S1001: YES), the processing flow proceeds to step 1003. In step 1003, communicating-party destination address deciding section 160 checks the beacon period slot number and determines whether or not it is duplicated by the beacon period slot number of another device. If the result of this determination is that the beacon period slot number is not duplicated (S1003: NO), in step 1004 transmission is performed using a combination-mode address. If the beacon period slot number is duplicated (S1003: YES), communication is aborted in step 1005.

In next data period 472 ("data period" being abbreviated to "DP" in the figure, and likewise hereinafter), the beacon period slot number is not duplicated, and therefore device P having address X switches the transmission destination address to combination mode (S415). That is to say, communicating-party destination address deciding section 160 takes the device Q combination-mode address as the transmission destination. Also, in device Q having address A, second address determining section 124 recognizes that the combination-mode address of the received frame is the address of that station (the local station). Together with this, device Q switches the transmission source address to combination mode (S420). That is to say, communicating-party destination address deciding section 160 takes the device Q combination-mode address as the transmission source.

On receiving a report from beacon processing section 140, communicating-party destination address deciding section 160 changes the device Q transmission source to the combination-mode address. By this means, device Q has address A switched to the combination-mode address, resolving the address duplication with device R and enabling synchronous communication to be continued.

Since the combination-mode old address and combination-mode new address are the same, the combination-mode old address is used.

In beacon period 474, communicating-party destination address deciding section 160 of device P having address X transmits a beacon displaying full-mode address A in a position corresponding to slot number 2 and a position corresponding to slot number 3 in the BPOIE (S425). The beacon information of device P having address X at this time is shown in FIG. 8. The device P beacon shows that the address of device P is X and its slot number is 1. The BPOIE shows that address A of communicating-party device Q performing communication as another device is in slot number 2, and in addition shows that address A is also in slot number 3 as a result of the existence of device R being recognized in step 405.

At this time, beacon processing sections 140 of devices R and Q detect that address A is duplicated by reading the BPOIE transmitted by X. By this means, devices R and Q can declare a new address in next beacon period 478.

Figure 12:
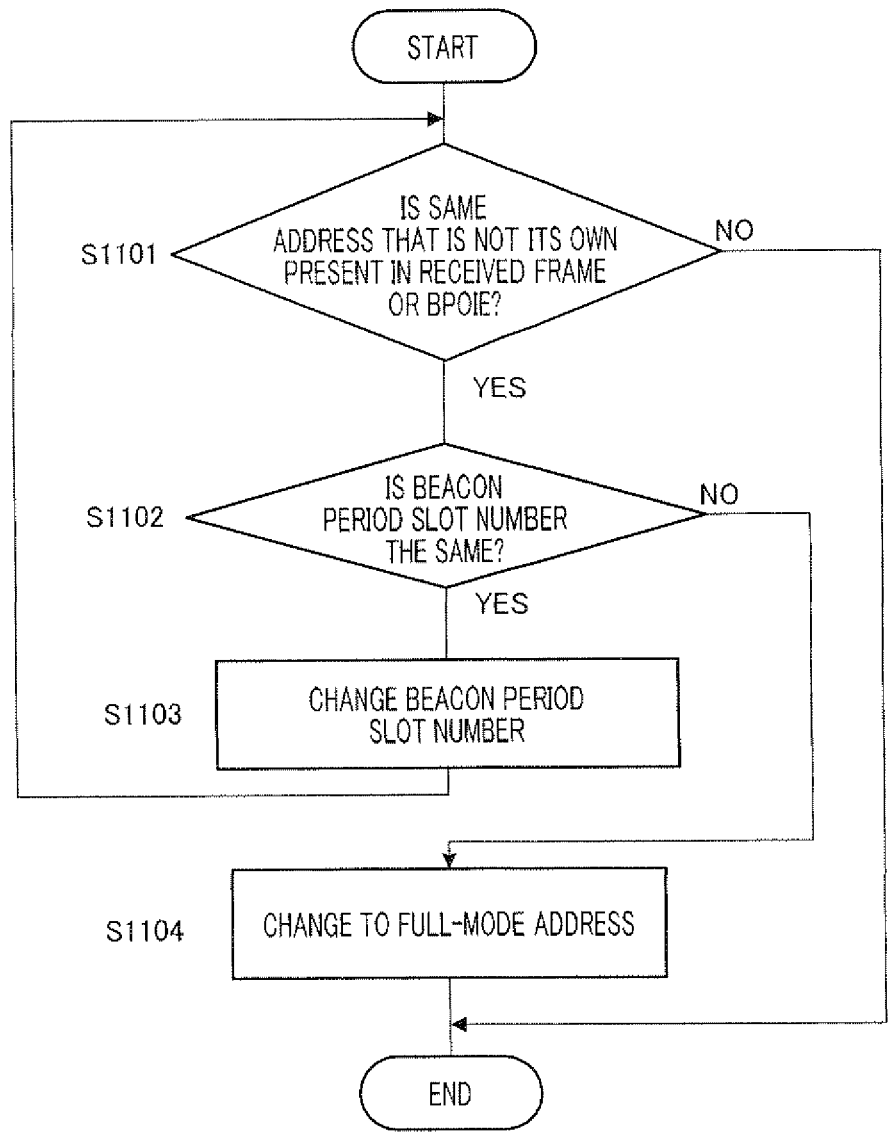
FIG. 12 is a flowchart showing an example of an address changing procedure.

FIG. 12 is a flowchart showing an example of the address changing procedure.

In step 1101, duplicate address processing section 145 determines whether or not there is an address identical to its own address in the transmission source address within a BPOIE or passed data. If the result of this determination is that there is a duplicate address (S1101: YES), the processing flow proceeds to step 1102. If there is no duplicate address (S1101: NO), the processing is terminated. In step 1102, duplicate address processing section 145 determines whether or not the duplicate address is using the same beacon period slot number as the beacon period slot number of its own address. If the result of this determination is that the beacon period slot numbers are the same (S1102: YES), in step 1103 duplicate address processing section 145 changes the beacon period slot number to an appropriate beacon period slot number. Then the processing flow proceeds to step 1104, and duplicate address processing section 145 changes the address changed to an appropriate beacon period slot number to the full-mode address (S1102: NO, S1104).

In data period 476, device R having address A according to the BPOIE transmitted from device P (S425) makes preparations to change address A to address B by means of duplicate address processing section 145 and communicating-party destination address deciding section 160 (S430). Specifically, by means of a report from beacon processing section 140, duplicate address processing section 145 generates a new address B and causes new address B information to be written to first address determining section 122. Also, communicating-party destination address deciding section 160 receives new address B from duplicate address processing section 145 and holds it, and can use new address B in subsequent beacons and frames.

Similarly, device Q having address A according to the BPOIE transmitted from device P makes preparations to change to address C by means of duplicate address processing section 145 and communicating-party destination address deciding section 160 (S435). Specifically, by means of a report from beacon processing section 140, duplicate address processing section 145 generates a new address C and causes new address C information to be written to first address determining section 122. Also, communicating-party destination address deciding section 160 receives new address C from duplicate address processing section 145 and holds it, and can use new address C in subsequent beacons and frames.

In this data period 476, device P having address X has not yet recognized communicating-party addresses B and C, and continue communication with device Q having address A in combination mode.

Next, in beacon period 478, device R creates a beacon with the address determined as B by communicating-party destination address deciding section 160, and transmits that beacon (S440). The beacon information transmitted by device R at this time is shown in FIG. 10. The beacon transmitted by device R shows that the address of device R is B and its slot number is 3. The BPOIE shows that address X is in slot number 1, and address A is in slot number 2.

Device Q transmits a beacon with C as the address (S450). The beacon information transmitted by device Q at this time is shown in FIG. 9. The beacon transmitted by device Q shows that the address is C and the slot number is 2. The BPOIE shows that address X is in slot number 1, and address A is in slot number 3.

On receiving these beacons, beacon processing section 140 of device P having address X recognizes that device Q has address C and device R has address B (S445), and conveys this to communicating-party destination address deciding section 160. If the device P beacon is later than the device Q beacon, the new address can be used in the next data period by making a reservation by means of a DRP with new address C. In device P, communicating-party destination address deciding section 160 makes preparations for changing the communicating-party destination address.

If the device P beacon is earlier than the device Q beacon, a DRP reservation cannot be made with new address C, and therefore the new address cannot be used in next data period 480, and the combination mode address used in previous data period 476 is used.

In data period 480, new address C may be used or the combination mode address may be used depending on the positional relationship of device P and device Q beacons as described above. In any case, synchronous communication between device P and device Q can be continued.

In data period 482, preparations for performing communication by means of new full-mode addresses are completed by the termination of BPOIE exchanges, and therefore communicating-party destination address deciding section 160 of device P having address X restores the transmission destination address to full mode (S455). Similarly, communicating-party destination address deciding section 160 of device Q whose address has become C restores the transmission source address to full mode (S460).

Thus, according to this embodiment, after device R having the same device address appears nearby or next-nearby, interruption of communication for a period of 2 to 3 super-frames that occurred with conventional technology can be eliminated, and communication can be continued, by temporarily using a combination-mode address and making a full-mode address change during that time. That is to say, by using an address in which a beacon period slot ID is combined with an ordinary address as a combination-mode address, address assignment can be performed so that devices having the same combination-mode address do not exist nearby or next-nearby, thus enabling the occurrence of communication interruption due to an address duplication to be prevented, and communication to be continued.

It is also possible to conceive of communication being performed using only a beacon period slot number as a device ID from the start. However, according to general Internet implementation technology for radio networks in wide use today, when node A (IP address: Ia, MAC address: Ma, DEVID: Da) attempts to communicate with node B (IP address: Ib, MAC address: Mb, DEVID: Db), since node A usually knows only the IP address of node B, node A first implements a procedure to resolve the MAC address from Ib. Then, when DEVID is used, as in this system, Db must be found. Generally, address resolution is executed by means of the following:

a) A cache of one's own previous address resolution results
b) New address resolution In address resolution, a MAC address matching an IP address attached to a request is obtained by means of a response by a device whose IP address conforms, and therefore network resources are consumed. Since MAC addresses are unique to individual devices, a cache will not become old unless the system uses a management means that changes IP addresses. The procedure for communication from A to B next shifts to DEVID retrieval from the MAC address. It is possible to implement DEVID retrieval from the MAC address by means of an inter-system call to the MAC layer. An inter-system call is generally an operation entailing a fairly heavy load in a current radio communication system in which the CPU is changed on a layer-by-layer basis, and therefore this retrieval is also cached. However, unlike a MAC address, a DEVID may be changed due to a DEVID duplication. As there are approximately $2^{16}$ possible values for general WiMedia or such like DEVIDs, DEVID duplications do not occur so often. However, when a DEVID is only a beacon period slot number, it becomes necessary for the cache to be destroyed since beacon period slot number changes occur frequently in a mobility environment or the like. That is to say, when a device detects a change in the beacon period slot number of a communicating party, cache destruction is necessary by reporting this to an upper layer. This imposes a heavy load on devices.

Consequently, a 2-mode configuration is used whereby an address including a beacon period slot number is utilized only in a temporary address-change transition period. In this way, it is possible to implement an efficient software configuration that makes cache updating unnecessary by having the IP layer transmit a MAC address in combination mode only for a short period in which a duplication flag set by the MAC layer is set.

Functions and operations implemented by this embodiment may also be implemented by a computer program, in which case a radio communication apparatus would be provided with memory that stores that program, a CPU that performs control, and so forth, not shown in the drawings. A medium that stores the program may also be an external storage medium, and may be EPROM, flash EEPROM, CD-ROM, or the like, for example.

The disclosures of Japanese Patent Application No. 2006-213645, filed on Aug. 4, 2006, and Japanese Patent Application No. 2007-202079, filed on Aug. 2, 2007, including the specifications, drawings and abstracts, are incorporated herein by reference in their entirety.

INDUSTRIAL APPLICABILITY

The present invention has an effect of preventing communication being interrupted due to an address duplication, and

The invention claimed is:

1. A radio communication apparatus in a wireless network system in which a plurality of radio communication apparatuses transmit beacons to each other, the radio communication apparatus comprising:
   an address processor that:
   (i) generates a first unicast address from a first address range, the first unicast address being a temporary address,
   (ii) generates a second unicast address randomly to attempt to be unique, from a second address range, and
   (iii) associates the first unicast address and the second unicast address with a single MAC (Media Access Control) processing unit;
   a beacon processor that determines whether or not a conflict exists between the second unicast address generated by the address processor and a second unicast address of another radio communication apparatus; and
   a transmitter that, in response to the beacon processor determining that the conflict exists, switches a value of a source address field of a data frame to be set from the second unicast address generated by the address processor to the first unicast address generated by the address processor and transmits the data frame to another radio communication apparatus in a data period, whereby the data frame includes as the source address the first unicast address generated by the address processor.

2. The radio communication apparatus according to claim 1, wherein a beacon period slot number is included in the first unicast address and derived from a transmission order of beacons transmitted by the plurality of radio communication apparatuses.

3. The radio communication apparatus according to claim 1, wherein the address processor, when it is determined by the beacon processor that the second unicast address generated by the address processor matches the second unicast address in the another radio communication apparatus, performs reassignment of the second unicast address.

4. The radio communication apparatus according to claim 3, further comprising an address decider that, when frame transmission is performed to the another radio communication apparatus with the second unicast address generated by the address processor as an own address, and it is determined by the beacon processor that the second unicast address generated by the address processor and the second unicast address in the another radio communication apparatus match, switches the own address to the first unicast address generated by the address processor, and after reassignment of the second unicast address by the address processor is completed, switches the own address to a post-reassignment second unicast address.

5. The radio communication apparatus according to claim 3, wherein the post-reassignment second unicast address includes a part other than a beacon period slot number included in the first unicast address in a position identical to a position in the first unicast address.

6. The radio communication apparatus according to claim 3, further comprising an address decider that, when frame transmission is performed to the another radio communication apparatus with the second unicast address generated by the address processor of the another radio communication apparatus as an own address and it is determined by the beacon processor that the second unicast address generated by the address processor of the another radio communication apparatus matches the second unicast address in a yet another radio communication apparatus, switches the own address to the first unicast address generated by the address processor of the radio communication apparatus, and after the reassignment of the second unicast address by the address processor of the radio communication apparatus is completed, switches the own address to a post-reassignment second unicast address.

7. The radio communication apparatus according to claim 1, wherein the address processor generates the first unicast address by utilizing a slot number.

8. A radio communication system in a wireless network system in which a plurality of radio communication apparatuses transmit beacons to each other, the radio communication system comprising a first radio communication apparatus and a second radio communication apparatus, wherein:
   the first radio communication apparatus has:
   an address processor that:
   (i) generates a first unicast address from a first address range, the first unicast address being a temporary address,
   (ii) generates a second unicast address from a second address range, and
   (iii) associates the first unicast address and the second unicast address with a single MAC (Media Access Control) processing unit;
   a first beacon processor that determines whether or not a conflict exists between the second unicast address generated by the address processor and a second unicast address of the second radio communication apparatus; and
   a transmitter that, in response to the first beacon processor determining that the conflict exists, switches a value of a source address field of a data frame to be set from the second unicast address generated by the address processor to the first unicast address generated by the address processor and transmits the data frame to the second radio communication apparatus, and
   the second radio communication apparatus has:
   a receiver that receives an address transmitted by the first radio communication apparatus;
   an address determiner that has a first unicast address generated from a third address range, the first unicast address of the second radio communication apparatus being a temporary address, and a second unicast address generated randomly to attempt to be unique, from a fourth address range, the first unicast address of the second radio communication device and the second unicast address of the second radio communication device being associated with a single MAC processing unit, and determines whether or not the address received by the receiver matches either the first unicast address of the second radio communication apparatus or the second unicast address of the second radio communication apparatus; and
   a second beacon processor that determines whether or not the second unicast address of the second radio communication apparatus matches the second unicast address of the first radio communication apparatus.

9. The radio communication system according to claim 8, wherein the address processor generates the first unicast address by utilizing a slot number.

10. A radio communication method in a wireless network system in which a plurality of radio communication apparatuses transmit beacons to each other, the radio communication method comprising:

an address generating step of (i) generating a first unicast address from a first address range, the first unicast address being a temporary address, (ii) generating a second unicast address randomly to attempt to be unique, from a second address range, and (iii) associating the first unicast address and the second unicast address with a single MAC (Media Access Control) processing unit;

a determining step of determining whether or not a conflict exists between the second unicast address generated in the address generating step and a second unicast address of another radio communication apparatus; and a transmitting step of, in response to the determining step determining that the conflict exists, switching a value of a source address field of a data frame to be set from the second unicast address generated in the address generating step to the first unicast address generated in the address generating step and transmitting the data frame to the another radio communication apparatus in a data period, whereby the data frame includes as the source address the first unicast address generated in the address generating step.

11. The radio communication method according to claim 10, wherein the first unicast address is generated by utilizing a slot number in the address generating step.

12. A radio communication apparatus in a wireless network system in which a plurality of radio communication apparatuses transmit beacons to each other, the radio communication apparatus comprising:

a beacon processor that determines whether or not a conflict exists between a second unicast address of a second radio communication apparatus to which the radio communication apparatus is currently communicating and a third unicast address of a third radio communication apparatus, and a transmitter that, in response to the beacon processor determining that the conflict exists between the second address of the second radio communication apparatus and the third address of the third radio communication apparatus, switches a value of a destination address field of a data frame to be set (i) from the second unicast address of the second radio communication apparatus (ii) to a first unicast address of the second radio communication apparatus wherein the first unicast address is generated by utilizing a slot number of the second radio communication apparatus currently communicating, the slot number indicates beacon transmission slot position in a beacon period.

\* \* \* \* \*